US006651701B2

United States Patent
Kuriiwa et al.

(10) Patent No.: US 6,651,701 B2
(45) Date of Patent: Nov. 25, 2003

(54) HYDROGEN STORAGE APPARATUS AND CHARGING METHOD THEREFOR

(75) Inventors: Takahiro Kuriiwa, Saitama (JP); Toshiaki Shimada, Saitama (JP); Yoshio Nuiya, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/056,703

(22) Filed: Jan. 24, 2002

(65) Prior Publication Data
US 2002/0100518 A1 Aug. 1, 2002

(30) Foreign Application Priority Data
Jan. 26, 2001 (JP) .......................... 2001-019019

(51) Int. Cl.[7] .............................. C01B 3/00; H01M 8/04
(52) U.S. Cl. .............................. 141/4; 141/18; 222/3; 137/14; 137/255; 206/0.7
(58) Field of Search .............................. 141/4, 18, 21; 206/0.7; 222/3, 6; 137/14, 255, 256, 265, 266

(56) References Cited

U.S. PATENT DOCUMENTS 4,343,770 A * 8/1982 Simons ....................... 422/112
5,916,245 A * 6/1999 Tom ........................... 62/46.1

FOREIGN PATENT DOCUMENTS

| JP | 05-106513 | 4/1993 |
| JP | 07-101255 | 4/1995 |
| JP | 09-142803 | 6/1997 |
| JP | 2000-012062 | 1/2000 |

* cited by examiner

Primary Examiner—J. Casimer Jacyna
(74) Attorney, Agent, or Firm—Lahive & Cockfield, LLP

(57) ABSTRACT

In order to achieve optimal weight and volume of a hydrogen storage apparatus, there is provided a method of charging hydrogen to a hydrogen storage apparatus. The hydrogen storage apparatus 1 includes a hydrogen storage means accommodating a hydrogen occlusive alloy (MH tank assembly) 3, and a hydrogen tank (high-pressure hydrogen tank) 2 that is provided separately from the hydrogen storage means 3 and stores hydrogen in gaseous form. Hydrogen is filled so that a pressure in the hydrogen tank is higher than that in the hydrogen storage means. A decompressing means (charger regulator) 6 is provided for reducing a pressure of hydrogen fed to the hydrogen storage apparatus 1 to maintain the pressure in a predetermined pressure range. The hydrogen storage apparatus 1 may include more than one of the hydrogen occlusive alloy tank (MH tank) 31.

7 Claims, 6 Drawing Sheets

HYDROGEN STORAGE APPARATUS AND CHARGING METHOD THEREFOR

BACKGROUND OF THE INVENTION

This invention relates to a hydrogen storage apparatus that supplies hydrogen to a fuel cell or other hydrogen-using devices, and to a method of charging hydrogen to the hydrogen storage apparatus.

On environmental considerations in recent years, attention is being given to a fuel cell electric vehicle (FCEV) in which carbon dioxide emissions causing global warming may be reduced. The fuel cell electric vehicle includes a fuel cell (FC) that triggers an electrochemical reaction of hydrogen ($H_2$) with oxygen ($O_2$) in the air, and electric power produced by the fuel cell is supplied to a traction motor to generate driving force.

Among apparatuses for supplying hydrogen to the fuel cell or other hydrogen-using devices, a hydrogen storage apparatus using a gastight pressure vessel containing a hydrogen occlusive alloy is very popular, which gastight pressure vessel will hereinafter be referred to as "MH tank". The MH is an abbreviation for metal hydride. The hydrogen occlusive alloy is an alloy that may absorb (or occlude) a great mass of hydrogen (or hydrogen gas), and give out (or emit) the occluded hydrogen as necessary. The hydrogen occlusive alloy characteristically generates heat upon occlusion of hydrogen, raising a temperature thereof, and absorbs heat upon emission of hydrogen, lowering the temperature thereof. In addition, as shown in FIG. 6, an equilibrium hydrogen pressure in the hydrogen occlusive alloy characteristically increases with a rise in temperature of the hydrogen occlusive alloy (the phenomenon is called high-temperature shift), and lowers with a drop in temperature of the hydrogen occlusive alloy (the phenomenon is called low-temperature shift). To be more specific, upon occlusion, a rise in temperature of the hydrogen occlusive alloy would raise the equilibrium hydrogen pressure, and thus reduce the amount of hydrogen that can be occluded. On the other hand, upon emission, a drop in temperature of the hydrogen occlusive alloy would lower the equilibrium hydrogen pressure, and thus inhibit hydrogen occluded from being emitted sufficiently.

Accordingly, the hydrogen storage apparatus is configured to cool the MH tank upon occlusion of hydrogen to prevent a rise in temperature, and to heat the MH tank upon emission of hydrogen to prevent a drop in temperature.

However, for example, upon startup of the hydrogen-using device (esp. upon cold startup thereof) or on other occasions where no heat source may be available for heating the MH tank, hydrogen cannot be sufficiently emitted from the MH tank.

Therefore, the hydrogen storage apparatus usually incorporates an auxiliary tank capable of emitting hydrogen at a low temperature, or is otherwise configured to make up a shortfall.

For instance, Japanese Laid-Open Patent Application, Publication No. 5-106513 discloses a hydrogen supplying apparatus for a hydrogen engine including a normal-time hydrogen occlusive tank and a startup-time hydrogen occlusive tank. The startup-time hydrogen occlusive tank in the hydrogen supplying apparatus includes a hydrogen occlusive alloy capable of emitting hydrogen under low-temperature conditions without application of heat. Since an internal pressure of the startup-time hydrogen occlusive tank tends to build up, the startup-time hydrogen occlusive tank is made relatively compact to acquire resistance to pressure while restricting increase in weight. Upon startup under cold conditions, the hydrogen supplying apparatus supplies hydrogen from the startup-time hydrogen occlusive tank to start a hydrogen engine.

Japanese Laid-Open Patent Application. Publication No. 7-101255 discloses a hydrogen automobile including a main fuel tank filled with a hydrogen occlusive alloy, and a small-volume subordinate fuel tank. In this hydrogen automobile, hydrogen is supplied from the subordinate fuel tank to an engine thereof upon startup. The subordinate fuel tank may be charged with hydrogen from the main fuel tank on some occasions. The subordinate fuel tank may be filled with a hydrogen occlusive alloy in some instances.

Japanese Laid-Open Patent Application, Publication No. 9-142803 discloses a hydrogen supplying apparatus in which a gas tank is coupled with a gas vent of a hydrogen occlusive alloy tank filled with a hydrogen occlusive alloy via a check valve, and a hydrogen feed pipe for feeding hydrogen to an external device (i.e., fuel cell) is coupled with a gas exhaust vent of the gas tank. This hydrogen supplying apparatus has the gas tank provided between the hydrogen occlusive alloy tank and the fuel cell, and is configured to supply hydrogen from the gas tank to the fuel cell upon startup by utilizing sufficiently high pressure (approximately 0.9 MPa) kept by the check valve in the gas tank. On the contrary, when the temperature of gas emitted from the fuel cell itself rises after startup, the internal pressure of the hydrogen occlusive alloy tank builds up, so that hydrogen is supplied from the hydrogen occlusive alloy tank by the action of the check valve.

Japanese Laid-Open Patent Application, Publication No. 2000-12062 discloses a hydrogen supplying apparatus including a main hydrogen storage tank accommodating a higher-temperature hydrogen occlusive alloy that may emit hydrogen under conditions of predetermined higher temperature, and a subordinate hydrogen storage tank accommodating a lower-temperature hydrogen occlusive alloy that may emit hydrogen under conditions of lower temperature below the predetermined higher temperature, and the like. This hydrogen supplying apparatus supplies hydrogen from the subordinate hydrogen storage tank to an external load (i.e. fuel cell) upon startup when the internal pressure of the main hydrogen storage tank is low, and starts supplying hydrogen from the main hydrogen storage tank to the external load some time after startup when the internal pressure of the main hydrogen storage tank gets higher.

However, the above-cited prior arts, which might possibly clear up difficulties in supplying hydrogen during startup, could not overcome disadvantages in weight. To be more specific, the MH tank accommodating (or filled with) a hydrogen occlusive alloy is compact in size, but heavy in weight, and thus would disadvantageously entail poor fuel efficiency when installed for example in a fuel cell electric vehicle. In addition, the heavy weight would disadvantageously make it difficult to handle the apparatus. Accordingly, weight reduction is critical. On the other hand, reduced amount of storable hydrogen that might take place due to the weight reduction would yield unfavorable results, eg., shorten a distance the fuel cell electrical vehicle may travel.

Moreover, heat generated upon occlusion of hydrogen in the MH tank would slow down a hydrogen charging speed (occlusion speed) of the hydrogen storage apparatus. This would disadvantageously result in longer hydrogen charging time.

Therefore, it is an object of the present invention to provide a hydrogen storage apparatus and hydrogen charging method in which the above-described disadvantages may be eliminated, and more specifically to provide a hydrogen storage apparatus fit to install in a vehicle.

SUMMARY OF THE INVENTION

In order to achieve the above object, the present inventors have discovered as a result of their thorough study that a hybrid system formed by combining a hydrogen storage means accommodating a hydrogen occlusive alloy, and a hydrogen tank containing hydrogen in gaseous form, each of which is configured to have an internal pressure set appropriately, may work with the above disadvantages surmounted, and consequently have brought the invention to perfection.

A method of charging hydrogen to a hydrogen storage apparatus (in claim 1) as one exemplified aspect of the present invention, in which the above-described disadvantages are eliminated, comprises the steps of filling hydrogen to a hydrogen storage means provided in the hydrogen storage apparatus to accommodate a hydrogen occlusive alloy, and filling hydrogen to a hydrogen tank provided in the hydrogen storage apparatus separately from the hydrogen storage means to store hydrogen in gaseous form, and hydrogen is filled so that a pressure in the hydrogen tank is kept higher than that in the hydrogen storage means.

An MH tank as will be explained later under the heading "Detailed description of the preferred embodiments" corresponds to the hydrogen storage means, in which a hydrogen occlusive alloy is stored. On the other hand, a high-pressure hydrogen tank as will be explained later under the same heading corresponds to the hydrogen tank, in which hydrogen is stored under high pressure. Of these two elements, the hydrogen storage means has an optimal pressure for storing hydrogen (storage pressure), beyond which increase in the amount of hydrogen storable would not be commensurate with the increase in pressure, by reason of equilibrium hydrogen pressure of the hydrogen occlusive alloy, and a structural capacity to resist pressure of the hydrogen storage means. Conversely, securing the capacity to resist pressure would require a thick material to constitute the hydrogen storage means, and would increase the weight of the hydrogen storage means. In contrast, the hydrogen tank, of which internal conditions are typically governed by the Boyle-Charles law, may accommodate more hydrogen as the pressure builds up more and more. Accordingly, this method of charging hydrogen to the hydrogen storage apparatus is so configured that the hydrogen tank stores hydrogen under higher pressure than the hydrogen storage means does.

In addition, occlusion of hydrogen in the hydrogen occlusive alloy generates great heat; however, according to this method, hydrogen is stored in the hydrogen tank as well as the hydrogen storage means containing an intense heat source. Therefore, unlike a case where hydrogen is stored only in the hydrogen storage means, this method serves to reduce the load on the hydrogen storage means, thus allowing the amount of heat generated in the hydrogen storage alloy to decrease. Although heat is generated due to adiabatic compression of hydrogen or the like upon charging hydrogen into the hydrogen tank as well, the amount of heat generated is less than that generated in the hydrogen storage means accommodating the hydrogen occlusive alloy. Consequently, the amount of heat generated from the hydrogen occlusive alloy may be restricted, and thus the time required to fill the hydrogen storage means with hydrogen may be saved.

According to another aspect of the present invention, there is provided a hydrogen storage apparatus that stores hydrogen to be supplied to a hydrogen-using device (in claim 2). This hydrogen storage apparatus comprises a hydrogen storage means that accommodates a hydrogen occlusive alloy and may supply hydrogen to the hydrogen-using device, a hydrogen tank that stores hydrogen in gaseous form and may supply the hydrogen to the hydrogen-using device, a first hydrogen filling line to fill hydrogen to the hydrogen storage means, a second hydrogen filling line to fill hydrogen to the hydrogen tank, and a decompressing means provided in the first hydrogen filling line to reduce a pressure of hydrogen fed through the first hydrogen filling line to maintain the pressure in a predetermined pressure range.

The hydrogen storage apparatus supplies hydrogen stored therein to a fuel cell or other type of hydrogen-using device, and becomes empty. Then, hydrogen is charged into the hydrogen storage apparatus. In this construction, the pressure of hydrogen filled from the first hydrogen filling line into the hydrogen storage means in the hydrogen storage apparatus is reduced to a predetermined range of pressure using the decompressing means (e.g., a regulator, a throttle, a pressure-reducing valve, etc.).

The decompression is carried out so that a pressure in the hydrogen tank is higher than that in the hydrogen storage means. Preferably, the predetermined pressure range may be set around a critical level that makes the hydrogen storage means unable to substantially increase amounts of occlusive hydrogen any more.

The hydrogen storage means may comprise a plurality of hydrogen storage tanks each accommodating the hydrogen occlusive alloy. The hydrogen storage means accommodating a hydrogen occlusive alloy is cooled upon occlusion of hydrogen, and heated upon emission of hydrogen. Accordingly, if a surface area of the hydrogen storage means is made broader by providing a plurality of hydrogen storage tanks, then heating/cooling operations may become more efficient.

The first and second hydrogen filling lines may include a common hydrogen filling port through which hydrogen is filled. Alternatively, the first and second hydrogen filling lines may each include a separate and differently shaped hydrogen filling port through which hydrogen is filled.

A hydrogen storage apparatus as yet another aspect of the present invention (in claim 7) also comprises a hydrogen storage means that accommodates a hydrogen occlusive alloy and may supply hydrogen to the hydrogen-using device, and a hydrogen tank that stores hydrogen in gaseous form and may supply the hydrogen to the hydrogen-using device, in which a pressure of hydrogen filled to the hydrogen storage means is maintained in a predetermined pressure range approximate to a critical level that makes the hydrogen storage means unable to substantially increase amounts of occlusive hydrogen any more, and the hydrogen storage apparatus has optimal volume and weight.

This construction allows the hydrogen storage apparatus to exert the same operation as above, while achieving a reduction in weight.

Other objects and further features of the present invention will become readily apparent from the following description of preferred embodiments with reference to accompanying drawings.

DETAILED DESCRIPTION OF THE PREFERRED EMBODIMENTS

A description will now be given of the preferred embodiments of the present invention with reference to the drawings.

First of all, the inventors determined a relationship among an internal pressure, volume, and weight of an MH tank as a hydrogen storage means by running a simulation.

The conditions for the simulation were:
(1) The MH tank used is made of cylindrical aluminum alloy having a length of 800 mm;
(2) The MH tank is filled with a predetermined body-centered cubic (bcc) hydrogen occlusive alloy at a predetermined filling rate; and
(3) The MH tank is charged with hydrogen to occlude 100 g of the hydrogen.

Under these conditions, the simulation is carried out to determine how the necessary volume and weight (including the weight of hydrogen occlusive alloy) of the MH tank vary with the internal pressure (storage pressure) of the MH tank. If the hydrogen occlusive alloy cannot occlude hydrogen so much, e.g., when the internal pressure of the MH tank is too low, the occlusion of 100 g of hydrogen that meets the above conditions requires more hydrogen occlusive alloys. This results in increase in volume of the MH tank to accommodate more hydrogen occlusive alloys (i.e., increase in diameter as the length of the MH tank is predetermined at 800 mm). As a matter of course, the weight of the hydrogen occlusive alloy stored in the MH tank and the weight of materials constituting the MH tank increase accordingly.

Figure 1:
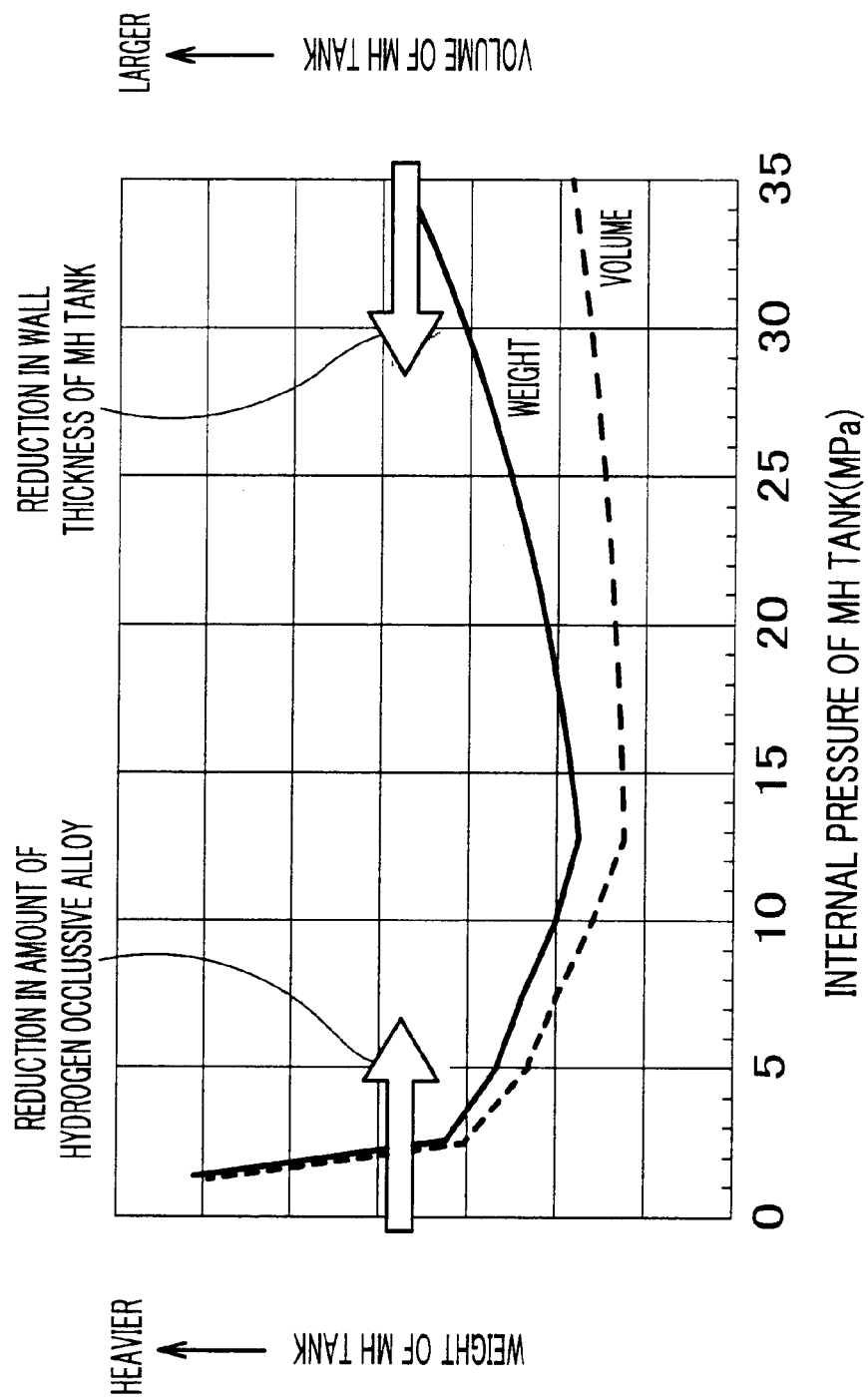
FIG. 1 shows a relationship between an internal pressure and volume/weight of the MH tank.

Referring to FIG. 1, a description will be given of a relationship among the internal pressure, volume, and weight of the MH tank as obtained from the simulation results. FIG. 1 is a graph showing the relationship among the internal pressure, volume, and weight of the MH tank, where the ordinates denote the weight and volume of the MH tank; the abscissas denote the internal pressure (storage pressure) of the MH tank. In FIG. 1, the relationship between the weight and internal pressure of the MH tank is indicated by a solid line; meanwhile, the relationship between the volume and internal pressure of the MH tank is indicated by a broken line.

As shown in FIG. 1, when the hydrogen pressure in the MH tank (hereinafter referred to as "internal pressure of the MH tank") is lower, the weight and volume of the MH tank both assume larger values. This is due to small amounts of hydrogen occluded in a unit hydrogen occlusive alloy as a result of low internal pressure of the MH tank (see FIG. 6), necessitating more hydrogen occlusive alloys to occlude 100 g of hydrogen. Moreover, increased volume of the hydrogen occlusive alloys to be stored requires a larger outer diameter of the MH tank (causing an increase in materials for the MH tank).

As the internal pressure becomes higher, the weight and volume of the MH tank both lower drastically. This is because even a slight rise in pressure boosts the amount of hydrogen occluded in the hydrogen occlusive alloy (see FIG. 6) according to equilibrium hydrogen pressure (plateau pressure), and thus the amount of hydrogen occlusive alloys required to occlude 100 g of hydrogen becomes small considerably. Moreover, reduced amount of hydrogen occlusive alloys required to occlude 100 g of hydrogen permits the outer diameter of the MH tank to be made very small (i.e., reduced amount of hydrogen occlusive alloys used in the MH tank leads to weight reduction).

Figure 6:
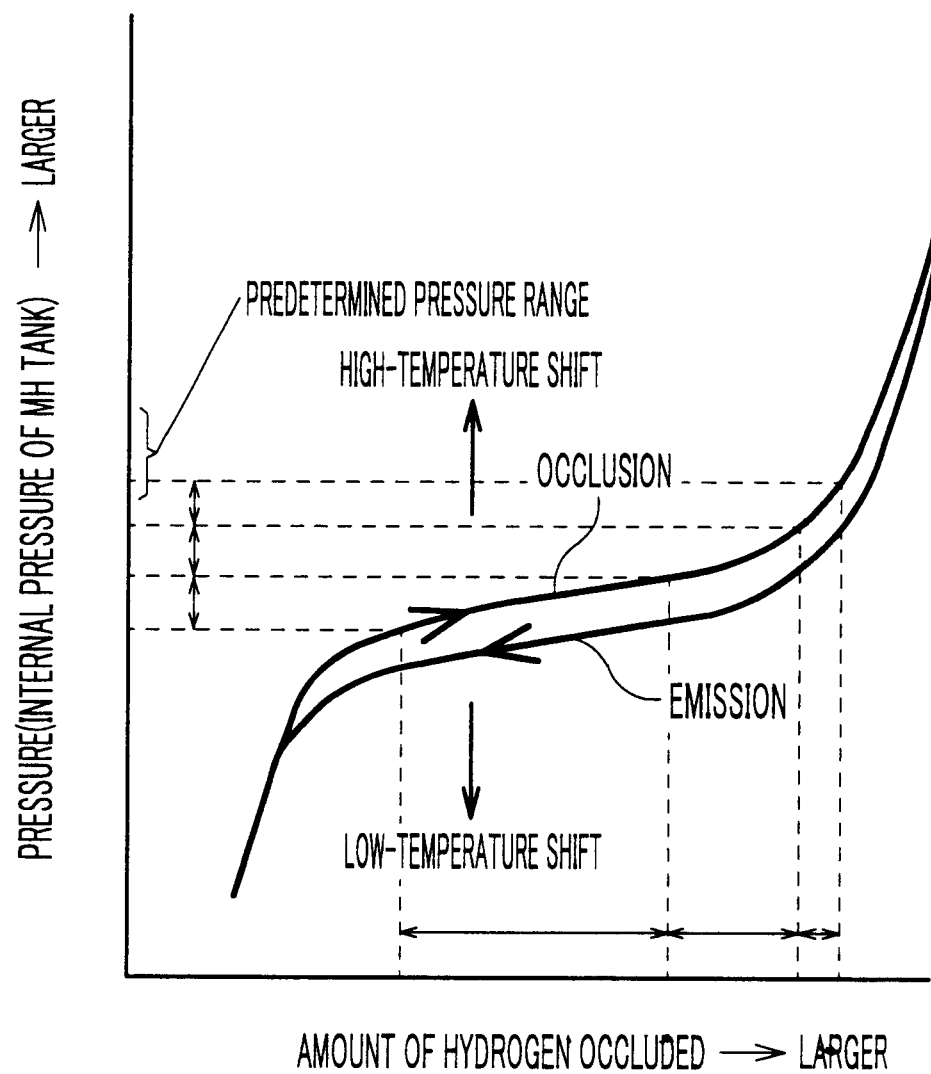
FIG. 6 is a P (pressure)—C (composition)—T (temperature) chart for showing properties of a hydrogen occlusive alloy.

As the internal pressure of the MH tank is raised further, the reduction of weight and volume of the MH tank caused by a rise in pressure reaches a limit. This is because the amount of hydrogen occluded in the hydrogen occlusive alloy has become saturated, and thus the amount of hydrogen occlusive alloy required to occlude the same 100 g of hydrogen cannot be reduced by building up the internal pressure of the MH tank, as shown in FIG. 6. The amount of hydrogen occluded in the MH tank would not increase with a rise in pressure beyond a predetermined pressure range (see FIG. 6). Raising the internal pressure of the MH tank not only increases the amount of hydrogen occluded in the hydrogen occlusive alloy, but also allows hydrogen to be compressed and stored in interstices surrounding the hydrogen occlusive alloy, and thus a pressure of hydrogen to be emitted also becomes higher, advantageously increasing the amount of hydrogen that can be emitted at a low temperature.

As shown in FIG. 1, the weight and volume of the MH tank tend to stay substantially at a constant level from a point at which the internal pressure of the MH tank is approximately 3 MPa or larger. The weight and volume of the MH tank reaches a minimum level around points at which the internal pressure of the MH tank ranges between approximately 10 to 15 MPa. The weight and volume of the MH tank tend to increase from a point at which the internal pressure of the MH tank is approximately 15 MPa or larger. The MH tank may have optimal volume and weight when the internal pressure is maintained at 3 Mpa or larger. The internal pressure varies with the kind of an alloy that is used.

When the internal pressure of the MH tank is raised further, the weight and volume of the MH tank increase. This is because the wall thickness of the MH tank required to secure pressure resistance thereof increases without fail as a result of increase in the internal pressure of the MH tank, while the hydrogen occlusive alloy cannot occlude hydrogen any more.

The increase in the wall thickness of the MH tank makes thermal conductivity between inside and outside of the MH tank lower, and thus makes it difficult to cool the hydrogen occlusive alloy in the MH tank. This retards occluding action or reduces the amount of hydrogen occluded. Consequently, this makes it impossible to obtain necessary amount of hydrogen when required, causing sluggish response.

It is shown that a gap exists between an increase in weight and increase in volume of the MH tank. This is because the increased internal pressure compresses the hydrogen existing in interstices around the hydrogen occlusive alloys in the MH tank; accordingly, the increased internal pressure of hydrogen slightly reduces the volume of the MH tank (outer diameter of the MH tank) required to occlude (store) the same 100 g of hydrogen.

Next, a description will be given of a relationship between the internal pressure of the high-pressure hydrogen tank and the amount of hydrogen stored therein, and a relationship between the internal pressure and weight of the high-pressure hydrogen tank.

With respect to the relationship between the internal pressure of the high-pressure tank and the amount of hydrogen stored therein, since the high-pressure hydrogen tank is a high-pressure container that stores hydrogen in gaseous form under high pressure, the higher the pressure is, the more the amount of hydrogen stored, under the Boyle-Charles law. In this respect, the high-pressure hydrogen tank is different from the MH tank that accommodates the hydrogen occlusive alloys and has only small interstices.

On the other hand, with respect to the relationship between the internal pressure and weight of the high-pressure hydrogen tank, the higher the internal pressure is, the thicker the necessary wall thickness of the high-pressure hydrogen tank, and the weight of the high-pressure hydrogen tank increases as the internal pressure increases. In this respect, an inclination of increase in weight of the high-pressure hydrogen tank is different from that of the MH tank.

The high-pressure hydrogen tank produces less heat than the MH tank, and does not so much need heating upon emission of hydrogen/cooling upon charging of hydrogen as the MH tank; therefore, the high-pressure hydrogen tank made of lightweight plastics (e.g., fiberglass reinforced plastic or FRP) may be used. Accordingly, the high-pressure hydrogen tank may store hydrogen under high pressure without increase in weight. Moreover, the high-pressure hydrogen tank may be made lighter than the MH tank by the weight of the hydrogen occlusive alloy stored in the MH tank, even in case where the same amount of hydrogen is stored (though the volume of the high-pressure hydrogen tank is larger than that of the MH tank in this case).

In view of these circumstances, the present invention proposes to store hydrogen using a so-called hybrid system made by combining the MH tank and the high-pressure hydrogen tank.

Next, a description will be given of a hydrogen storage apparatus as one embodiment of the present invention.

Figure 2:
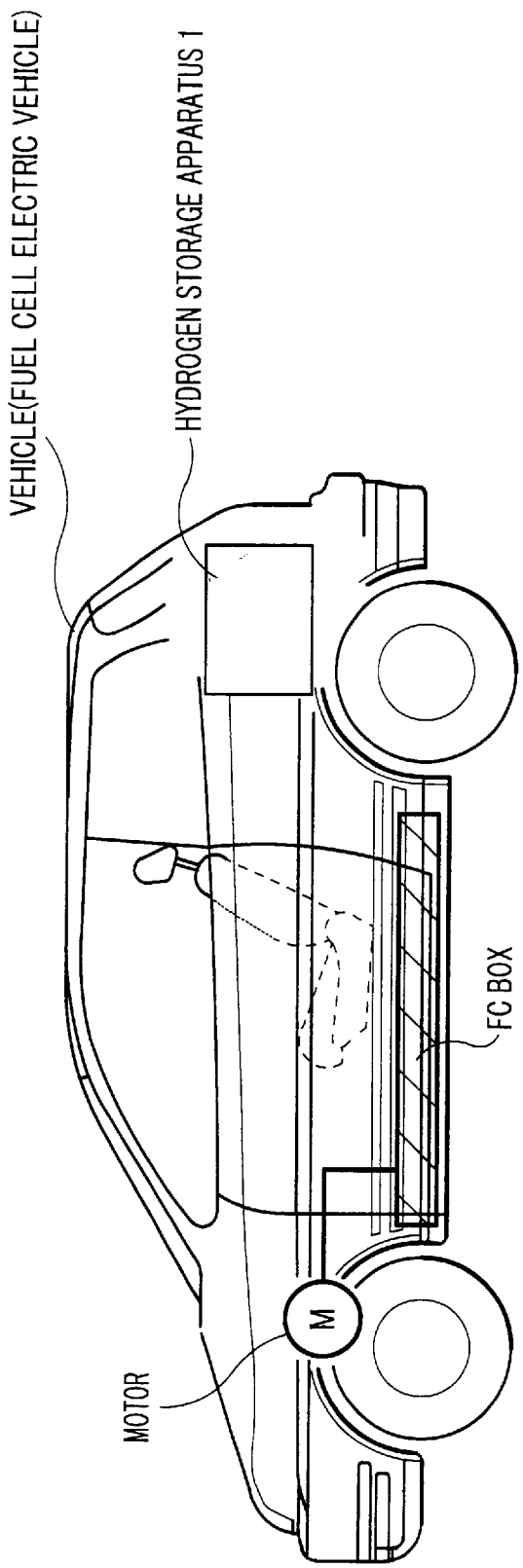
FIG. 2 is a phantom side view of a vehicle (fuel cell electric vehicle) in which a hydrogen storage apparatus as one embodiment of the present invention is installed.
Figure 3:
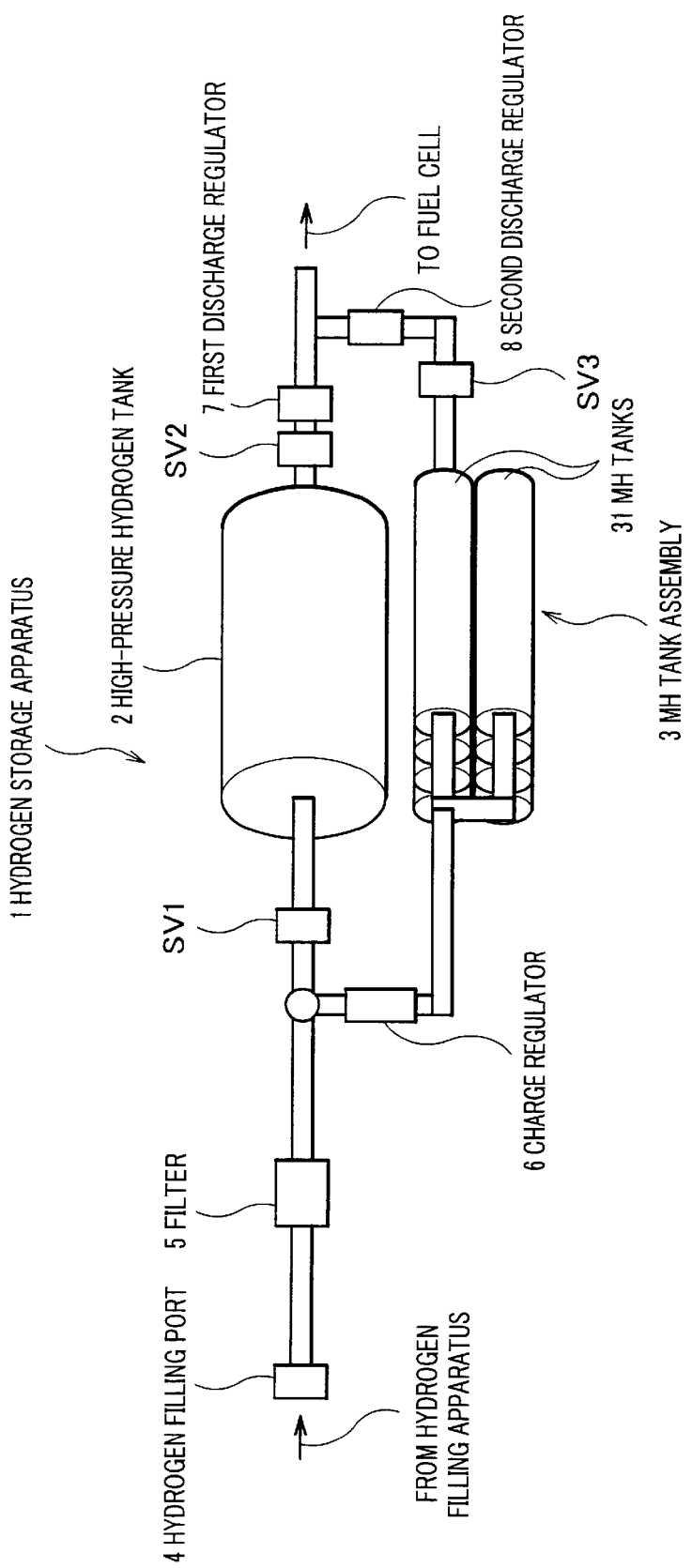
FIG. 3 is a block diagram of a hydrogen storage apparatus as one embodiment of the present invention.

FIG. 2 is a phantom side view of a fuel cell electric vehicle (hereinafter referred to as "vehicle") in which a hydrogen storage apparatus as one embodiment of the present invention is installed. FIG. 3 is a block diagram of a hydrogen storage apparatus as one embodiment of the present invention.

As shown in FIG. 2, a hydrogen storage apparatus 1 in the present embodiment is installed in a rear portion of the vehicle. In the vehicle is installed a fuel cell (FC) box under passenger seats. This FC box accommodates a fuel cell (hydrogen-using device). In addition, a traction motor is installed in a front portion of the vehicle. The fuel cell is connected with the hydrogen storage apparatus 1 via a hydrogen feed pipe (not shown).

As shown in FIG. 3, the hydrogen storage apparatus 1 includes a high-pressure hydrogen tank 2, an MH tank assembly 3, a hydrogen filling port 4, a filter 5, a charge regulator 6, a first discharge regulator 7, a second discharge regulator 8, and pipes that connect these components. Symbols SV1, SV2, and SV3 denote electromagnetic valves (cutoff valves). In the hydrogen storage apparatus 1 as shown in FIG. 3, the high-pressure hydrogen tank 2 and the MH tank assembly 3 are connected to the fuel cell (hydrogen-using device) in parallel.

The high-pressure hydrogen tank 2 is a tank made of fiberglass reinforced plastic (FRP), and is structurally pressure-tight and gastight. The high-pressure hydrogen tank 2 is lightweight. The high-pressure hydrogen tank 2 is filled with hydrogen, for example, at 25 MPa of pressure at the highest. The high-pressure hydrogen tank 2 serves to supply the fuel cell with hydrogen during startup when a pressure of hydrogen to be emitted is low in the MH tank assembly 3 because of low temperature of the hydrogen occlusive alloy. Moreover, the high-pressure hydrogen tank 2 serves to supply the fuel cell with hydrogen in normal times, as well. To be more specific, it is shown that the following equation is satisfied: AMOUNT OF HYDROGEN REQUIRED (CONSUMED) IN FUEL CELL=AMOUNT OF HYDROGEN DISCHARGED FROM MH TANK ASSEMBLY 3+AMOUNT OF HYDROGEN DISCHARGED FROM HIGH-PRESSURE HYDROGEN TANK 2.

The MH tank assembly 3 is a collective body formed by connecting a plurality of MH tanks 31 of the same size together (irrespective of whether the MH tanks 31 are connected in series or in parallel). The MH tank 31 is a gastight and pressure-tight tank made of aluminum alloy that is higher in heat resistance and in thermal conductivity than materials made of resin. The MH tank 31 accommodates a hydrogen occlusive alloy inside. The MH tank 31 may occlude hydrogen at 3–5 MPa of pressure at the highest. Moreover, the MH tank 31 may be heated/cooled by heating/cooling means (not shown). The MH tank assembly 3 is formed from a plurality of the MH tanks 31 each accommodating the hydrogen occlusive alloy so that the hydrogen occlusive alloy may be heated/cooled quickly. The amount of hydrogen storable in the MH tank assembly 3 is set as much as the amount of hydrogen storable in the high-pressure hydrogen tank 2.

Included among usable hydrogen occlusive alloys are:

$AB_2$ alloy (Laves phase alloy); $TiCr_2$, $(Zr, Ti)(Ni, Mn, V, Fe)_2$, etc.;

$AB_5$ alloy; $LaNi_5$, $MmNi_5$, etc.;

bcc alloy; Ti—V—Cr, Ti—V—Mn, etc.; and

Alloys of other types; Magnesium alloys.

NB: Mm in $MmNi_5$ is an abbreviation of misch metal.

The hydrogen filling port 4 is used when a vehicle stops over a hydrogen station like a gas station to fill hydrogen. The hydrogen filling port 4 is structurally combined with a check valve so as to prevent backflow of hydrogen filled from a hydrogen filling apparatus (not shown).

The filter 5 is a filter that removes dust, and impurity such as oxygen, water, and the like that might deteriorate the hydrogen occlusive alloy, which could be included in the hydrogen fed from the hydrogen filling apparatus.

The charge regulator 6 is a pressure-reducing valve (decompressing means) that reduces pressure of hydrogen supplied from the hydrogen filling apparatus to the MH tank 31 to a predetermined pressure. The first discharge regulator 7 is a pressure-reducing valve that reduces pressure of hydrogen supplied from the high-pressure hydrogen tank 2 to the fuel cell (hydrogen-using device) to a predetermined pressure. The second discharge regulator 8 is a pressure-reducing valve that reduces pressure of hydrogen supplied from the MH tank assembly 3 to the hydrogen-using device to a predetermined pressure. Each regulator 6, 7, 8 serves as a check valve.

The electromagnetic valve SV1 provided upstream of the high-pressure hydrogen tank 2 serves to restrict supply of hydrogen stored in the high-pressure hydrogen tank 2 at high pressure, in normal times via the charge regulator 6. The electromagnetic valve SV1 further serves to discontinue application of a high pressure for supplying hydrogen from the hydrogen filling apparatus after completion of charging into the high-pressure hydrogen tank 2, thereby preventing overcharge of hydrogen in the high-pressure hydrogen tank 2. Even if the same amount of hydrogen is charged, the time required to fill the high-pressure hydrogen tank 2 with hydrogen is shorter than the time required to fill the MH tank assembly 3. The electromagnetic valve SV2 downstream of the high-pressure hydrogen tank 2 serves to prevent unintentional supply of hydrogen from the high-pressure hydrogen tank 2 to the fuel cell. Just as with the electromagnetic valve SV2, the electromagnetic valve SV3 downstream of the MH tank assembly 3 serves to prevent unintentional supply of hydrogen from the MH tank assembly 3 to the fuel cell. The electromagnetic valves SV1, SV2, and SV3 are under control of a controller (not shown).

The internal pressure of the high-pressure hydrogen tank 2 is measured with a pressure sensor (not shown). The amount of hydrogen stored in the MH tank assembly 3 (hydrogen storage amount) is also measured with a pressure sensor (not shown). Each measurement is transmitted to the controller, and the controller provides a warning indicating a remaining amount of hydrogen in the high-pressure hydrogen tank 2 and the MH tank assembly 3 based upon the measurements. In order to obtain a precise amount of hydrogen remaining in the MH tank 3, the temperature in the MH tank 31 is controlled to stay at a predetermined level.

Next, a description will be given of an operation of the above-described hydrogen storage apparatus 1.

Figure 4:
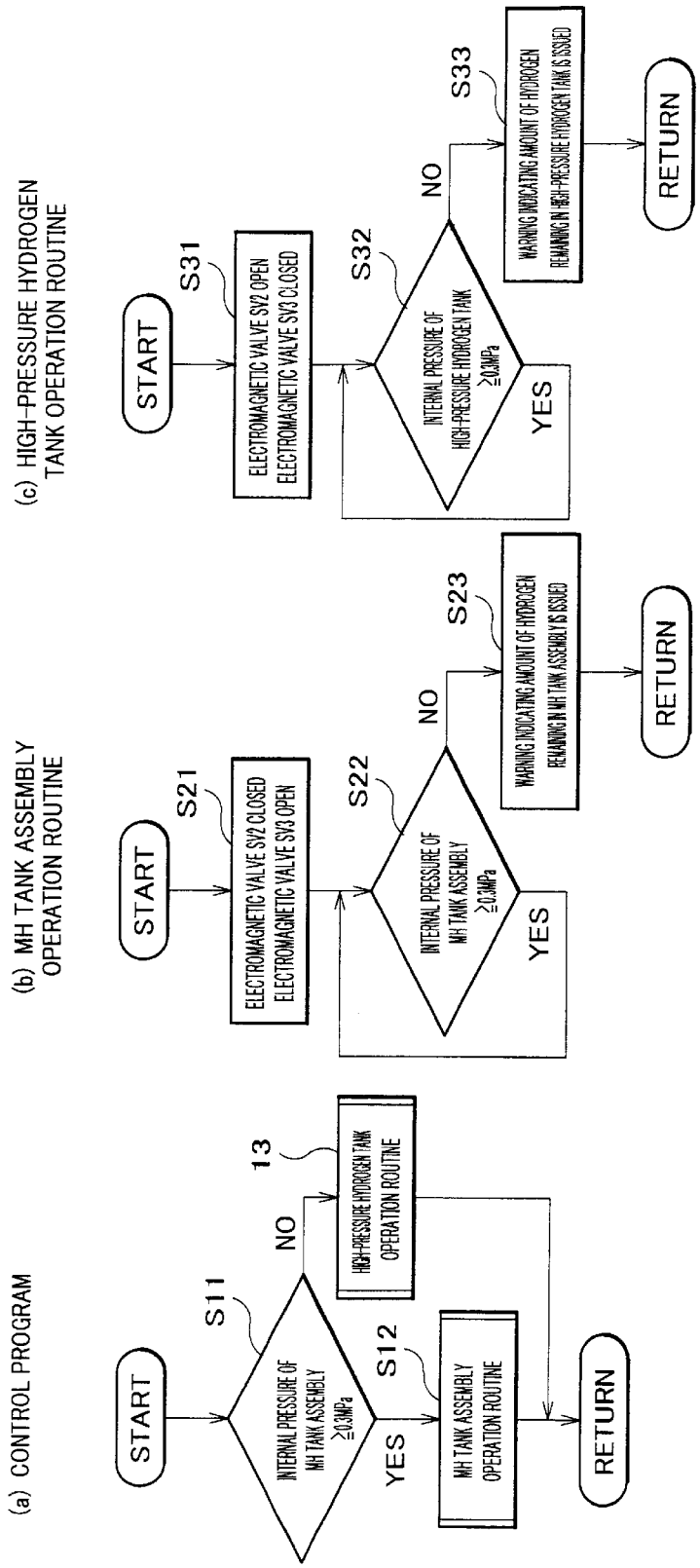
FIG. 4 is a flowchart for explaining an operation of the hydrogen storage apparatus as shown in FIG. 3 supplying hydrogen to a fuel cell: (a) indicates procedural steps of a control program; (b) indicates an operation routine of an MH tank assembly; and (c) indicates an operation routine of a high-pressure hydrogen tank.

FIG. 4 is an operation flowchart for explaining a procedural steps of the hydrogen storage apparatus supplying a fuel cell with hydrogen; (a) indicates procedural steps of a control program, (b) indicates an operation routine of the MH tank assembly, and (c) indicates an operation routine of the high-pressure hydrogen tank.

The process of charging hydrogen into the hydrogen storage apparatus 1 is as follows (see FIG. 3).

A driver stops over a hydrogen station to fill a vehicle (hydrogen storage apparatus 1 thereof) with hydrogen when remaining amounts of hydrogen in the high-pressure hydrogen tank 2 and the MH tank assembly 3 gets short. The driver is notified of the remaining amounts based upon the measurements acquired via the above-described pressure sensor if the controller determines that the notification (as a warning) is necessary.

The filling of hydrogen is initiated upon connection of a hydrogen supply port of the hydrogen filling apparatus (not shown) with the hydrogen filling port 4 of the hydrogen storage apparatus 1, followed by filling the hydrogen storage apparatus 1 with hydrogen at a high pressure (e.g., 35 MPa) from the hydrogen filling apparatus.

Hydrogen passes through the hydrogen filling port 4 and the filter 5, and then branches; one flow passes through the electromagnetic valve SV1 that is open and is supplied to the high-pressure hydrogen tank 2. The other flow branched off passes through the charge regulator 6 and is supplied to the MH tank assembly 3. In that event, the electromagnetic valves SV2, SV3 are closed to prevent hydrogen from being fed from the high-pressure hydrogen tank 2 and the MH tank assembly 3 to the fuel cell. The charge regulator 6 reduces high pressure of hydrogen supplied from the hydrogen filling apparatus to 5 MPa or so. Since an appropriate hydrogen pressure is applied in each MH tank 31 with the charge regulator 6, the wall thickness of the MH tank 31 may be made thinner, and a lightweight (and compact) body of the apparatus may be realized. The thinner wall thickness may contribute to improved thermal conductivity between inside and outside of the MH tank 31.

When the filling of hydrogen is completed, the electromagnetic valve SV1 is closed, and the connection between the hydrogen filling port 4 and the hydrogen supply port is released. The hydrogen filling port 4 serves as a check valve, and thus no hydrogen leaks out when the hydrogen supply port is disconnected from the hydrogen filling port 4.

The hydrogen stored in the hydrogen storage apparatus 1 is supplied to the fuel cell in such a manner as described herein with reference to FIGS. 3 and 4.

First, the controller executes a control program (see FIG. 4(a)). The control program determines in step S11 whether INTERNAL PRESSURE OF MH TANK ASSEMBLY 3 $\geq$ 0.3 MPa (gauge pressure) is satisfied. The pressure of 0.3 MPa may be considered as a reference pressure below which the pressure of hydrogen emitted from the MH tank assembly 3 at a specific temperature (e.g., 40° C.) indicates imminent exhaustion of remaining amount of hydrogen stored in the MH tank assembly 3. This reference pressure varies with the kind of the hydrogen occlusive alloy and the controlled temperature. This reference pressure is a lower limit pressure required to maintain a stable operation of a fuel cell system (and thus varies with specifications of the fuel cell system).

If the internal pressure of the MH tank assembly 3 (at 40° C.) is equal to or more than 0.3 MPa (YES), the process goes to an MH tank assembly operation routine (S12) to supply hydrogen from the MH tank assembly 3 to the fuel cell. On the contrary, if the internal pressure of the MH tank assembly 3 is less than 0.3 MPa (NO, upon exhaustion), the process turns to a high-pressure hydrogen tank operation routine (S13) to supply hydrogen from the high-pressure hydrogen tank 2 to the fuel cell. In other words, if hydrogen (pressure thereof) remains in the MH tank assembly 3, then the MH tank assembly 3 is assigned higher priority and used to supply the fuel cell with hydrogen. In this configuration, the MH tank assembly 3 of which remaining amount detection is more difficult may be emptied out first, so that the amount of hydrogen in the whole hydrogen storage apparatus 1 may be detected easier.

In the MH tank assembly operation routine (see FIG. 4(b)), the electromagnetic valve SV2 is closed, while the electromagnetic valve SV3 is open (s21). This allows hydrogen to be supplied from the MH tank assembly 3 to the fuel cell via the electromagnetic valve SV3 and the second discharge regulator 8.

Next, it is determined (S22) whether INTERNAL PRESSURE OF MH TANK ASSEMBLY 3 (HYDROGEN DISCHARGE PRESSURE) $\geq$ 0.3 MPa (gauge pressure) is satisfied. The implication of 0.3 MPa of pressure is as described above. If the internal pressure of the MH tank assembly 3 is equal to or more than 0.3 MPa (YES), the process is kept going, and the pressure in the MH tank assembly 3 is being monitored. In short, the determination made in step S22 continues to be effective. This is because hydrogen to be fed to the fuel cell still remains in the MH tank assembly 3. On the other hand, the internal pressure of the MH tank assembly 3 is less than 0.3 MPa (NO), a warning message indicating an amount of hydrogen remaining in the MH tank assembly 3 is issued (S23). This is for the purpose of notifying the driver of no hydrogen remaining in the MH tank assembly 3. Then, the process goes back to the determination steps by the control program (RETURN).

Returning to the control program, it is determined in step S11 whether INTERNAL PRESSURE OF MH TANK ASSEMBLY 3 (HYDROGEN DISCHARGE PRESSURE)

≧0.3 MPa (gauge pressure) is satisfied, and if the internal pressure of the MH tank assembly 3 is less than 0.3 MPa (NO), the process proceeds to the high-pressure hydrogen tank operation routine, as described above (S13).

In the high-pressure hydrogen tank operation routine (see FIG. 4(c)), the electromagnetic valve SV2 is open, while the electromagnetic valve SV3 is closed. This allows hydrogen to be supplied from the high-pressure hydrogen tank 2 to the fuel cell via the electromagnetic valve SV2 and the first discharge regulator 7.

Next, it is determined (S32) whether INTERNAL PRESSURE OF HIGH-PRESSURE HYDROGEN TANK 2 (HYDROGEN DISCHARGE PRESSURE)≧0.3 MPa (gauge pressure) is satisfied. The pressure of 0.3 MPa may be considered as a reference pressure below which the internal pressure of hydrogen in the high-pressure hydrogen tank 2 indicates imminent exhaustion of remaining amount of hydrogen stored in the high-pressure hydrogen tank 2. A variation of the pressure according to temperatures is not so conspicuous as in the MH tank assembly 3. If the internal pressure of the high-pressure hydrogen tank 2 is equal to or more than 0.3 MPa (YES), the process is kept going, and the pressure in the high-pressure hydrogen tank 2 is being monitored. In short, the determination made in step S32 continues to be effective. This is because hydrogen to be fed to the fuel cell still remains in the high-pressure hydrogen tank 2. On the other hand, the internal pressure of the high-pressure hydrogen tank 2 is less than 0.3 MPa (NO), a warning message indicating an amount of hydrogen remaining in the high-pressure hydrogen tank 2 is issued (S33). This is for the purpose of notifying the driver of no hydrogen remaining in the high-pressure hydrogen tank 2. Then, the process goes back to the determination steps by the control program (RETURN).

Through these steps, hydrogen stored in the high-pressure hydrogen tank 2 and the MH tank assembly 3 are consumed.

The present invention is not limited to the above-described embodiment, but various modifications and changes may be made to carry out the present invention without departing from the spirit and scope thereof.

Figure 5:
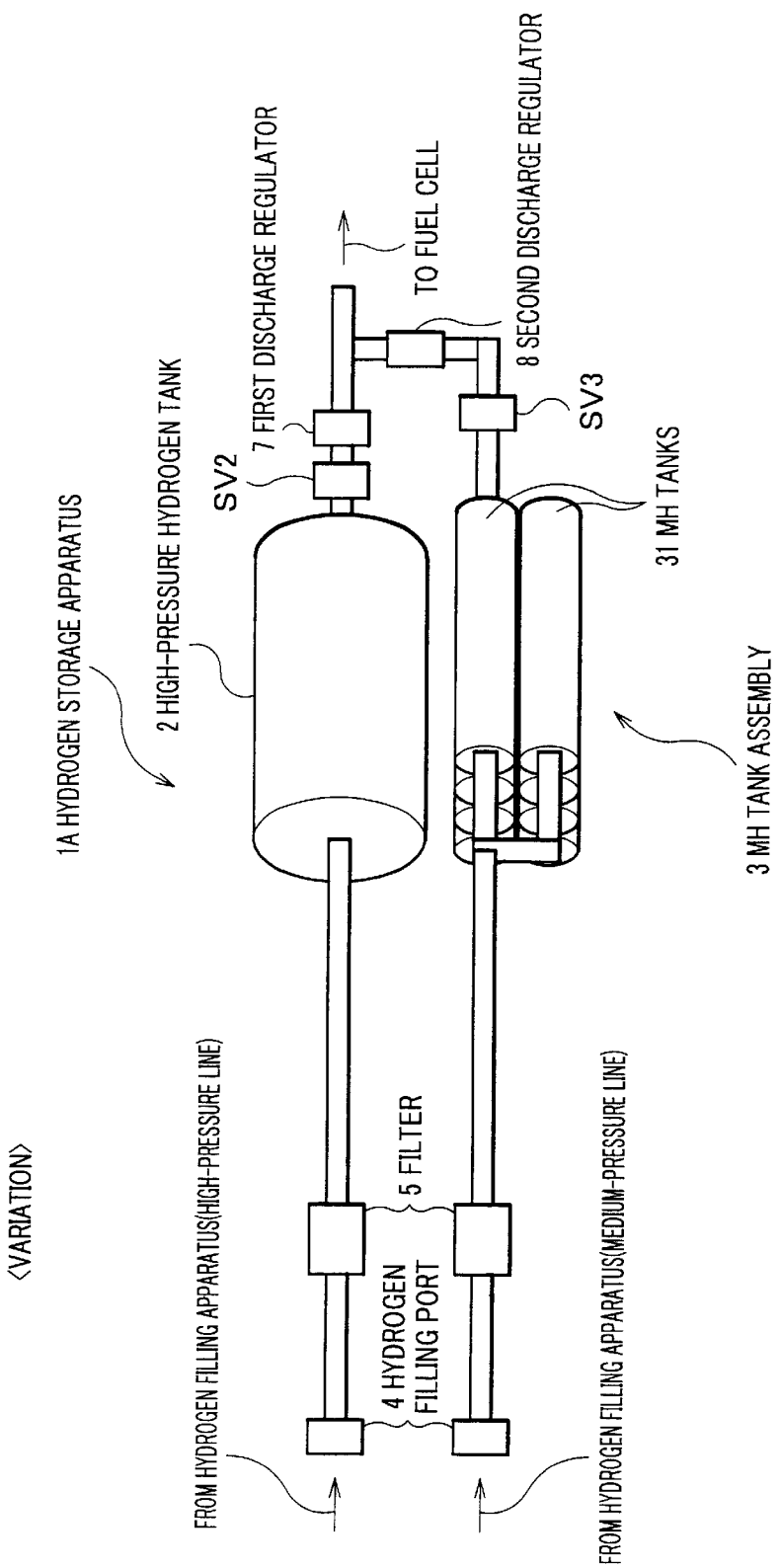
FIG. 5 is a block diagram of a variation of the hydrogen storage apparatus according to the present invention.

For example, like a hydrogen storage apparatus 1A that is shown in FIG. 5 as a variation, a hydrogen filling line for supplying hydrogen to the high-pressure hydrogen tank 2, and a hydrogen filling line for supplying hydrogen to the MH tank assembly 3 may be provided independently. This hydrogen storage apparatus 1A may be adapted to such a hydrogen filling apparatus in the hydrogen station as includes a high-pressure line for charging the high-pressure hydrogen tank 2 and a medium-pressure line for charging the MH tank assembly 3. In this embodiment, the hydrogen filling ports 4 for high-pressure use and for medium-pressure use may preferably be different from each other in size or the like, considering the possible confusion upon coupling the hydrogen supply ports with corresponding hydrogen filling lines.

Further, the electromagnetic valve SV1 shown in FIG. 3 may be replaced with a check valve to prevent the high-pressure hydrogen tank 2 from supplying hydrogen to the MH tank assembly 3 in normal times. The electromagnetic valve SV1 may be used together with a regulator such as the charge regulator 6. Hydrogen may be discharged from both of the high-pressure hydrogen tank 2 and the MH tank assembly 3 and supplied to the fuel cell. Although the high-pressure hydrogen tank 2 and the MH tank assembly 3 are connected in parallel in FIG. 3, the high-pressure hydrogen tank 2 and the MH tank assembly 3 may be connected to the fuel cell in series. In this embodiment, the pressure of hydrogen has to be so controlled that hydrogen under higher pressure from the high-pressure hydrogen tank 2 or the hydrogen filling apparatus is not applied to the MH tank assembly 3. With this condition, whether the high-pressure hydrogen tank 2 and the MH tank assembly 3 are connected in series or in parallel does not matter.

Furthermore, the fuel cell electric vehicle has been taken above as an example for explaining the present invention, but the present invention may also be applied to a hydrogen vehicle including a hydrogen engine that operates on hydrogen fuel, or the like. Moreover, the present invention is applicable to a stationary hydrogen-using device, as well.

Among embodiments of the present invention as discussed above, a method of charging hydrogen to a hydrogen storage apparatus as set forth in claim 1 uses a hydrogen storage means accommodating a hydrogen occlusive alloy and a hydrogen tank that stores hydrogen in gaseous form in combination to charge hydrogen; accordingly, the hydrogen storage apparatus may be made lighter than in a conventional method in which only a hydrogen storage means is used to store the same amount of hydrogen. The hydrogen storage apparatus may be made more compact than in a conventional method in which only a hydrogen tank is used to store the same amount of hydrogen. In the inventive method, hydrogen is filled so that a pressure in the hydrogen tank is higher than that in the hydrogen storage means, and therefore the wall thickness of the hydrogen storage means may be made thinner. Accordingly, the hydrogen storage apparatus may be made lighter. Moreover, the thinner wall thickness of the hydrogen storage means makes a heating/cooling process quicker, and consequently makes it possible to take out hydrogen more easily and to fill hydrogen more easily. During startup under low temperature or in other conditions where the pressure of the hydrogen storage means is too low, hydrogen may be fed from the hydrogen tank. In comparison with a method of charging only the hydrogen storage means with hydrogen, an amount of heat generated in the hydrogen storage means may be diminished. Diminished amount of generated heat results in shortened time for charging (occluding) hydrogen, and less thermal load on materials constituting the hydrogen storage means.

Further, according to the apparatus as set forth in claims 3–7, the pressure of hydrogen fed to the hydrogen storage means is maintained in a predetermined pressure range approximate to a critical level that makes the hydrogen storage means unable to substantially increase amounts of occlusive hydrogen any more. Therefore, the hydrogen storage apparatus having optimal volume and weight may be realized, while achieving advantages as described above. The hydrogen storage apparatus includes a plurality of the hydrogen storage means (or hydrogen occlusive alloy tanks), and thus may be heated/cooled more easily. Consequently, hydrogen may be taken out or occluded (charged) quickly.

What is claimed is:

1. A method of charging hydrogen from a hydrogen filling apparatus to a hydrogen storage apparatus which includes a hydrogen storage means that accommodates a hydrogen occlusive alloy, and a hydrogen tank that is provided separately from the hydrogen storage means and stores hydrogen in gaseous form, the method comprising the steps of:
   filling hydrogen from the hydrogen filling apparatus to the hydrogen storage means; and
   filling hydrogen from the hydrogen filling apparatus to the hydrogen tank,
   wherein hydrogen is filled from the hydrogen filling apparatus so that a pressure in the hydrogen tank is kept higher than that in the hydrogen storage means.

2. A hydrogen storage apparatus that stores hydrogen to be supplied to a hydrogen-using device, comprising:
- a hydrogen storage means that accommodates a hydrogen occlusive alloy and may supply hydrogen to the hydrogen-using device;
- a hydrogen tank that stores hydrogen in gaseous form and may supply the hydrogen stored therein to the hydrogen-using device;
- a first hydrogen filling line to fill hydrogen to the hydrogen storage means;
- a second hydrogen filling line to fill hydrogen to the hydrogen tank; and
- a decompressing means provided in the first hydrogen filling line to reduce a pressure of hydrogen fed through the first hydrogen filling line to maintain the pressure in a predetermined pressure range.

3. A hydrogen storage apparatus according to claim 2, wherein the hydrogen storage means comprises a plurality of hydrogen storage tanks each accommodating the hydrogen occlusive alloy.

4. A hydrogen storage apparatus according to claim 2, wherein the predetermined pressure range is set around a critical level that makes the hydrogen storage means unable to substantially increase amounts of occlusive hydrogen any more.

5. A hydrogen storage apparatus according to claim 2, wherein the first and second hydrogen filling lines include a common hydrogen filling port through which hydrogen is filled.

6. A hydrogen storage apparatus according to claim 2, wherein the first and second hydrogen filling lines each include a separate and differently shaped hydrogen filling port through which hydrogen is filled.

7. A method of conveying hydrogen from a hydrogen filling apparatus to a hydrogen storage apparatus, wherein said hydrogen storage apparatus includes a hydrogen storage means having a hydrogen occlusive alloy and a hydrogen tank separate from the hydrogen storage means for storing hydrogen in a gaseous form, the method comprising:
- conveying hydrogen from the hydrogen filling apparatus to the hydrogen storage means when disposed in the hydrogen storage apparatus,
- conveying hydrogen from the hydrogen filling apparatus to the hydrogen tank, and
- maintaining a pressure in the hydrogen tank higher than a pressure in the hydrogen storage means.

* * * * *